US012698023B2

(12) United States Patent
Gao et al.

(10) Patent No.: US 12,698,023 B2
(45) Date of Patent: Aug. 4, 2026

(54) CHILD SEAT DEVICE AND CHILD PRODUCT

(71) Applicant: GOODBABY CHILD PRODUCTS CO., LTD., Kunshan (CN)

(72) Inventors: Xiang Gao, Kunshan (CN); Feng Li, Kunshan (CN)

(73) Assignee: GOODBABY CHILD PRODUCTS CO., LTD., Kunshan (CN)

( * ) Notice: Subject to any disclaimer, the term of this patent is extended or adjusted under 35 U.S.C. 154(b) by 393 days.

(21) Appl. No.: 18/262,910

(22) PCT Filed: Feb. 26, 2021

(86) PCT No.: PCT/CN2021/078180
§ 371 (c)(1),
(2) Date: Jul. 25, 2023

(87) PCT Pub. No.: WO2022/160405
PCT Pub. Date: Aug. 4, 2022

(65) Prior Publication Data
US 2024/0083485 A1 Mar. 14, 2024

(30) Foreign Application Priority Data

Jan. 29, 2021 (CN) .......................... 202110126418.7

(51) Int. Cl.
*B62B 9/10* (2006.01)
*B62B 9/24* (2006.01)
(52) U.S. Cl.
CPC ............... *B62B 9/104* (2013.01); *B62B 9/24* (2013.01)
(58) Field of Classification Search
CPC .... B60N 2/2878; B60N 2/2875; B62B 9/104; B62B 9/24

(Continued)

(56) References Cited

U.S. PATENT DOCUMENTS 5,303,979 A * 4/1994 Koyanagi .............. B60N 2/286
297/487
5,395,154 A * 3/1995 Wang ................... B60N 2/2218
280/30

(Continued)

FOREIGN PATENT DOCUMENTS

AU 2015213404 A1 3/2016
CA 2357369 A1 3/2022

(Continued)

OTHER PUBLICATIONS

International Search Report and Written Opinion issued for International Patent Application No. PCT/CN2021/078180, dated Nov. 3, 2021 in 16 pages including English translation of International Search Report.

*Primary Examiner* — Jose V Chen

(74) *Attorney, Agent, or Firm* — MUNCY, GEISSLER, OLDS & LOWE, P.C.

(57) ABSTRACT

A child seat device includes a backrest, a seat and a tether system. The backrest is rotatably connected to the seat. The seat device has a sitting side and a back side. The tether system comprises a shoulder strap and a crotch strap. The shoulder strap is arranged on the backrest. The crotch strap has a connecting end and a fixed end. The portion of the crotch strap on the sitting side is a first strap segment. The connecting end is located on the first strap segment and can be detachably connected to one end of the shoulder strap. The fixed end is fixedly connected to the back side of the seat device.

15 Claims, 11 Drawing Sheets

(58) Field of Classification Search
USPC .......................................... 297/256.1, 256.13
See application file for complete search history.

(56) References Cited

U.S. PATENT DOCUMENTS

| | | | | |
|---|---|---|---|---|
| 6,698,841 | B1 | 3/2004 | Glover et al. | |
| 8,789,886 | B2 * | 7/2014 | Mason ................. | B60N 2/2806 |
| | | | | 297/253 |
| 8,905,478 | B2 * | 12/2014 | Strong ................. | B60N 2/2884 |
| | | | | 297/254 |
| 9,925,893 | B1 * | 3/2018 | Burmeister .......... | B60N 2/2881 |
| 10,052,982 | B1 * | 8/2018 | Danley ................ | B60N 2/2878 |
| 2002/0109391 | A1 | 8/2002 | Shie et al. | |
| 2020/0008587 | A1 | 1/2020 | Graco et al. | |

FOREIGN PATENT DOCUMENTS

| | | | | |
|---|---|---|---|---|
| CN | 1282298 | A | | 1/2001 |
| CN | 1408302 | A | | 4/2003 |
| CN | 101863237 | A | | 10/2010 |
| CN | 103213520 | A | | 7/2013 |
| CN | 204547854 | U | | 8/2015 |
| CN | 205345008 | U | | 6/2016 |
| CN | 105905067 | A | | 8/2016 |
| CN | 205632188 | U | | 10/2016 |
| CN | 205970941 | U | | 2/2017 |
| CN | 107161202 | A | | 9/2017 |
| CN | 210793089 | U | | 6/2020 |
| CN | 211032264 | U | | 7/2020 |
| CN | 112849255 | A | | 5/2021 |
| CN | 112918542 | A | | 6/2021 |
| CN | 221214185 | U | * | 6/2024 |
| EP | 1809508 | A2 | | 7/2007 |
| JP | 1993049470 | U | | 6/1993 |
| JP | 06115384 | A | * | 4/1994 |
| JP | 1994042379 | U | | 6/1994 |
| JP | 06219195 | A | * | 8/1994 |
| JP | 1996268222 | A | | 10/1996 |
| JP | 2000168411 | A | | 6/2000 |
| JP | 2000301972 | A | | 10/2000 |
| JP | 2005-162151 | A | | 6/2005 |
| JP | 2005313888 | A | | 11/2005 |
| JP | 2012-025229 | A | | 2/2012 |
| KR | 20120010102 | A | | 2/2012 |

* cited by examiner

CHILD SEAT DEVICE AND CHILD PRODUCT

CROSS-REFERENCE TO RELATED APPLICATIONS

This application is the U.S. National Stage of PCT/CN2021/078180 filed on Feb. 26, 2021, which claims priority to Chinese Patent Application 202110126418.7 filed on Jan. 29, 2021, the entire content of both are incorporated herein by reference in their entirety.

TECHNICAL FIELD OF THE INVENTION

The present disclosure relates to a child seat device, and a child product having the child seat device.

BACKGROUND OF THE INVENTION

Existing children's products such as children's sitting saddles, children's strollers and other children's products are provided with a child seat device; the child seat device has a seat, a backrest, and a seat belt assembly to restrain the child in the seat device; the seat belt assembly includes a crotch strap and a shoulder strap, the crotch strap is connected to the seat, and the shoulder strap is connected to the backrest. Usually, in order to meet the different needs of children's sitting posture changes, such as sitting at different leaning angles and lying posture changes, the backrest is usually adjustable in angle relative to the seat.

However, after the angle of the backrest relative to the seat is adjusted, such as changed from the sitting-posture state to the lying-posture state, a distance between the position of the shoulder strap connected to the backrest and the position of the crotch strap connected to the seat becomes longer, resulting in the seat belt being taut, causing the child's body to be bound very tight and causing uncomfortable sitting. At present, this problem is mainly solved by adjusting the length of the crotch strap or shoulder strap, but this leads to that the user needs to adjust the length of the seat belt in every adjustment of the angle of the backrest, causing the inconvenience of use.

SUMMARY OF THE INVENTION

The purpose of the present disclosure is to overcome the defects of the prior art and provide a new child seat device.

To achieve the above purpose, a technical solution employed by the present disclosure is: a child seat device comprises a backrest, a seat and a tether system, the backrest is rotatably connected to the seat, the seat device has a sitting side and a back side, the tether system comprises a shoulder strap and a crotch strap, the shoulder strap is arranged on the backrest, the crotch strap has a connecting end and a fixed end, the connecting end and the fixed end are respectively arranged on two opposite end portions of the length extension direction of the crotch strap, the portion of the crotch strap on the sitting side is a first strap segment, the connecting end is located on the first strap segment and can be detachably connected to one end of the shoulder strap, the fixed end is fixedly connected to the back side of the seat device, the seat device has a sitting-posture state and a lying-posture state, the length of the first strap segment in the sitting-posture state is shorter than the length of the first strap segment in the lying-posture state, and during the transition process of the seat device from the sitting-posture state to the lying-posture state, the length of the first strap segment gradually becomes longer.

Preferably, the crotch strap passes through the seat in a manner of being able to slide in its own length direction, and during the transition process of the seat device between the sitting-posture state and the lying-posture state, the sliding of the crotch strap relative to the seat causes the length of the first strap segment changes.

Further, the crotch strap further has a second strap segment on the back side, the fixed end is located on the second strap segment, the second strap segment and the first strap segment are connected in the length direction, and the longer the first strap segment, the shorter the second strap segment.

Preferably, the fixed end is fixedly connected to the backrest.

In one specific embodiment, the backrest has an anchoring element, the fixed end is fixedly connected to the anchoring element, and the anchoring element and the rotation centerline of the backrest relative to the seat are spaced in the height direction of the backrest.

In one specific embodiment, the anchoring element is located on the backrest above the rotation centerline of the backrest relative to the seat.

In one specific embodiment, a lower portion of the backrest is connected to a rear portion of the seat through a soft component, or, a lower portion of the backrest is rotatably connected to a rear portion of the seat through a rotation shaft, and the rotation centerline between the seat and the backrest extends in a left-right direction.

Preferably, the shoulder strap slides through the backrest, the tether system further comprises an adjustment strap, the adjustment strap is fixedly arranged on the shoulder strap, the adjustment strap has a connection position in front of the seat, and an adjustment segment between the connection position and the shoulder strap, and the seat is provided with a strap adjustment mechanism for adjusting the length of the adjustment segment.

In one specific embodiment, the strap adjustment mechanism is a one-way lock mechanism or an automatic winding mechanism.

In one specific embodiment, the adjustment segment is located on the back side, the adjustment strap is slidably connected to a front portion of the seat, and the adjustment strap has an extension segment extending to the sitting side.

In one specific embodiment, the position where the crotch strap is arranged on the seat is behind the connection position between the adjustment strap and the seat in the length extension direction of the seat.

In one specific embodiment, the shoulder strap comprises a left shoulder strap and a right shoulder strap, the left shoulder strap and the right shoulder strap respectively slide through the backrest, each of the left shoulder strap and the right shoulder strap has a first end portion and a second end portion arranged at two opposite ends of its own length direction, the first end portions can be detachably connected to the connecting end of the crotch strap, and the two second end portions are fixedly arranged on the adjustment strap.

As another preferred way, one end portion of the shoulder strap is fixedly arranged on the backrest, and the other end portion of the shoulder strap is detachably connected to the connecting end of the crotch strap.

Another purpose of the present disclosure is to provide a child product having the above-mentioned child seat device.

To achieve the above purpose, a technical solution employed by the present disclosure is: a child product comprises the above-mentioned child seat device.

Preferably, the child product is a child stroller or a child sitting saddle.

Due to the use of the above technical solutions, the present disclosure has the following advantages over the prior art: In the child seat device and the child product having the child seat device of the present disclosure, when a child sits in this seat device, and when adjusting the angle between the backrest and the seat to meet the needs of the child in different sitting or lying postures, the tether system can be adjusted with the rotation of the backrest and automatically compensate for the total length of a safety belt on the front side of the child body when the backrest angle is increased, such that the child is not bound too tightly; when the backrest angle is decreased, the total length of the safety belt on the front side of the child body is automatically reduced so as to ensure that the tether system binds the child firmly.

wherein, 1, backrest; 11, anchoring element; 2, seat; 21, one-way lock mechanism; 3, tether system; 31, shoulder strap; 31*a*, first end portion; 31*b*, second end portion; 311, adjustment strap; 311*a*, adjustment segment; 311*b*, extension segment; 312, left shoulder strap; 313, right shoulder strap; 32, crotch strap; 321, connecting end; 322, fixed end; 32*a*, first strap segment; 32*b*, second strap segment; 4, waist strap; 5, buckle assembly; 6, rotation shaft.

DETAILED DESCRIPTION OF EXEMPLARY EMBODIMENTS

The technical solution of the present disclosure is further described below combining with the accompanying drawings and specific embodiments.

For the convenience of description, the following descriptions of up and down, front and rear, left and right directions are defined based on the direction observed by a child sitting on the seat device.

Embodiment 1

Figure 1:
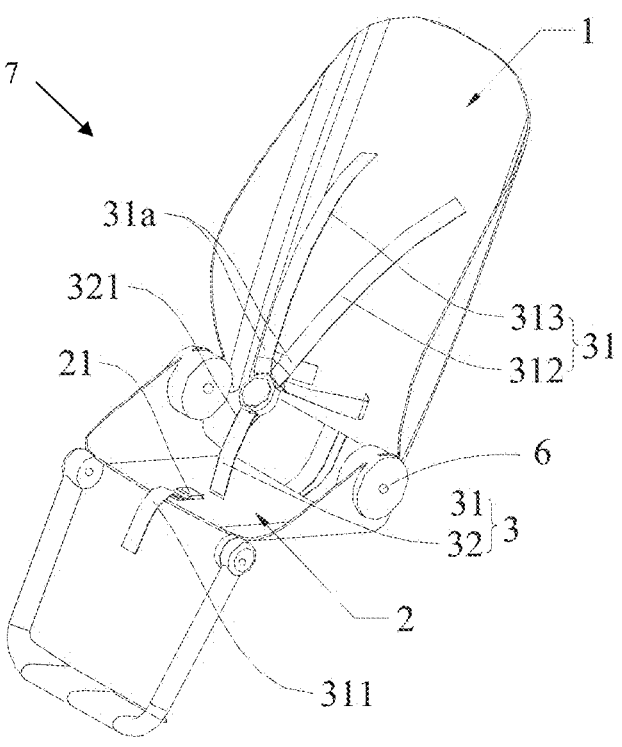
FIG. 1 to FIG. 4 are respectively a stereoscopic schematic diagram, front-view schematic diagram, side-view schematic diagram and rear-view schematic diagram of the child sitting saddle in Embodiment 1 of the present disclosure, where the seat device is in a sitting-posture state.
Figure 2:
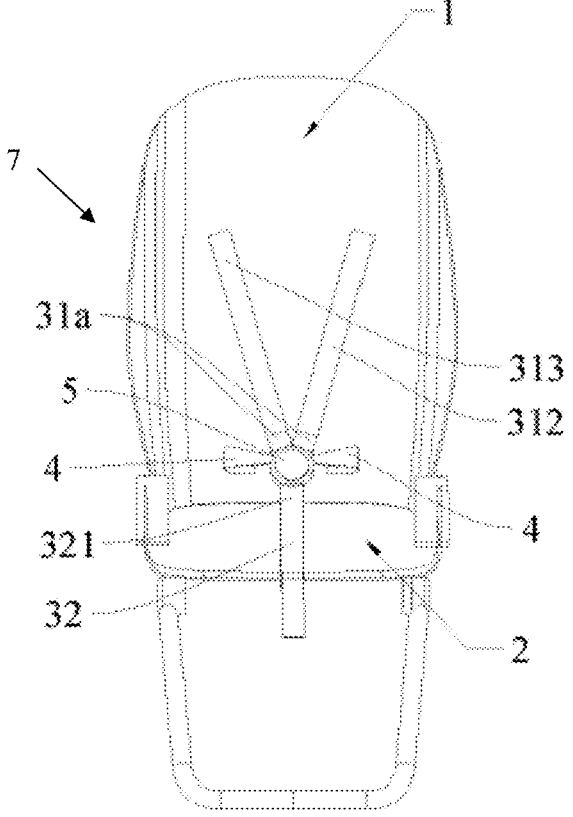
Figures 3, 4:
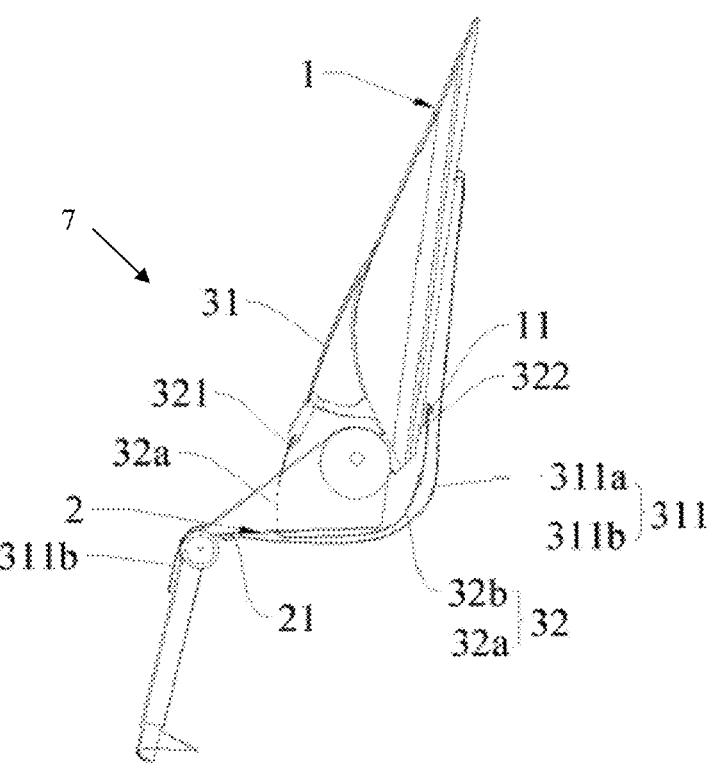
Figure 5:
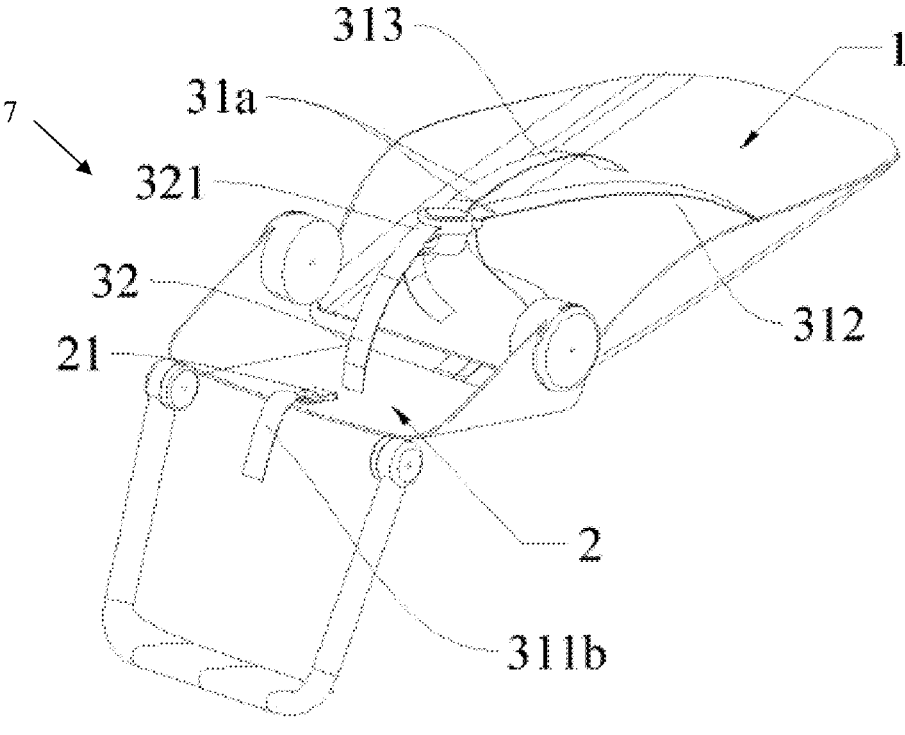
FIG. 5 to FIG. 8 are respectively a stereoscopic schematic diagram, rear-view schematic diagram, side-view schematic diagram and front-view schematic diagram of the child sitting saddle in Embodiment 1 of the present disclosure, where the seat device is in a lying-posture state.
Figure 6:
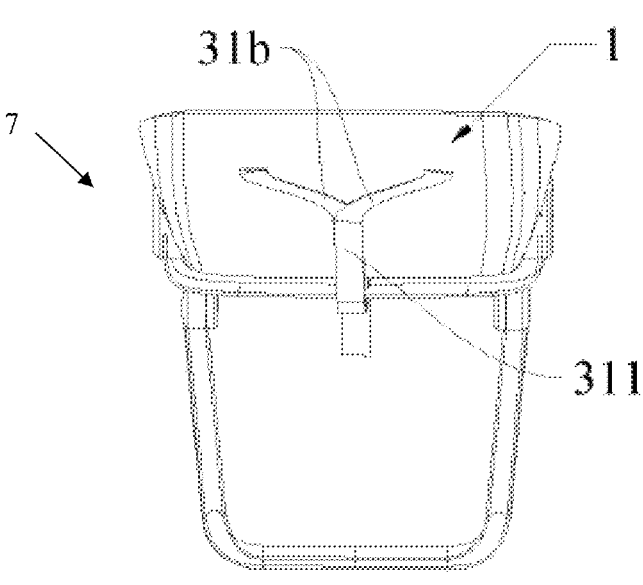
Figure 7:
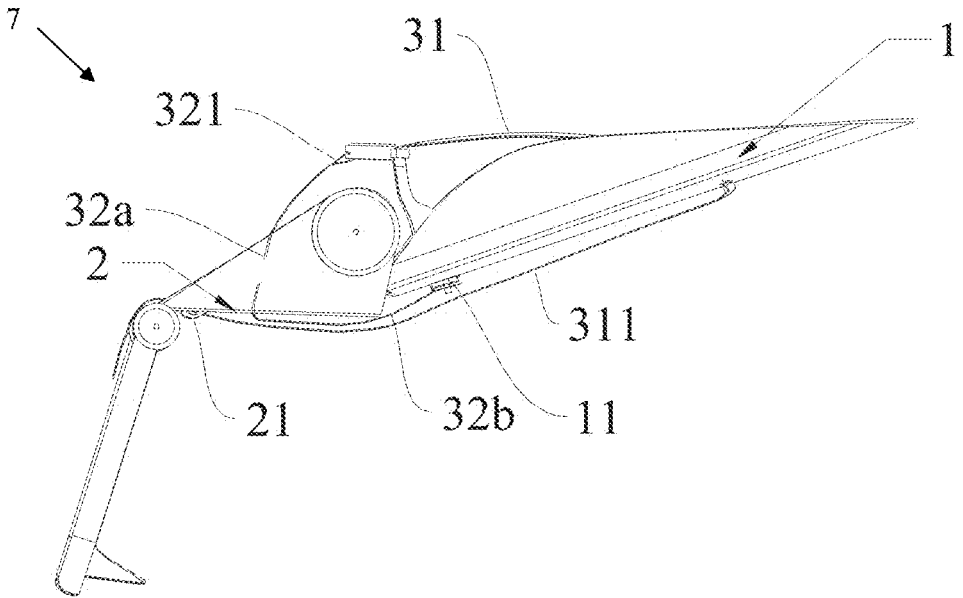
Figure 8:
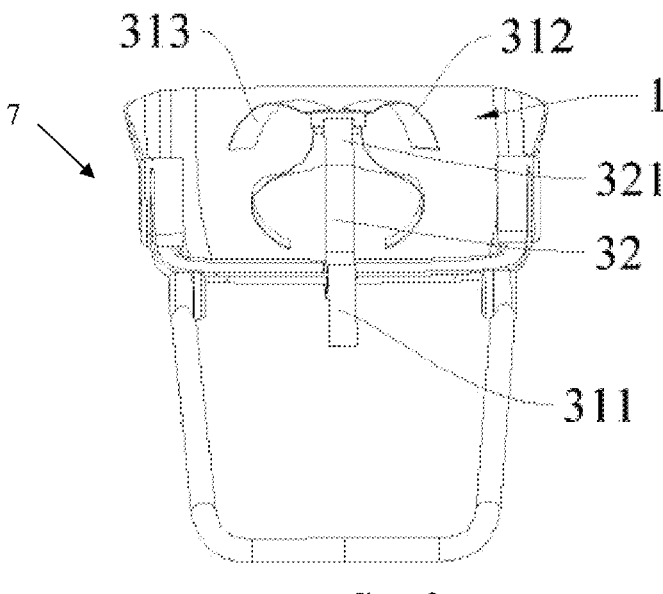

A child seat device is shown in FIG. 1 to FIG. 8, here is specifically a child sitting saddle 7, which comprises a backrest 1, a seat 2 and a tether system 3, and the angle between the backrest 1 and the seat 2 can be adjusted. Here, a lower portion of the backrest 1 is rotatably connected to a rear portion of the seat 2 by a rotation shaft 6, the axial line of the rotation shaft 6 extends in a left-right direction, that is, the rotation centerline of the backrest 1 relative to the seat 2 extends in the left-right direction; a lock mechanism is further arranged between the seat 2 and the backrest 1 to lock the backrest 1 and the seat 2 at different angle positions, so that the backrest 1 has different usage angels relative to the seat 2. In other embodiments, the lower portion of the backrest 1 may be connected to the rear portion of the seat 2 through a soft connecting member, and another mechanism is used to restrict the angle of the backrest 1, so that the angle stabilizes at the adjusted angle position. The seat device has a sitting side and a back side, the sitting side and the back side are separated by the backrest 1 and the seat 2, that is, the side on which a child sits when the child is riding is the sitting side, in front of backrest 1 and above the seat 2 are the sitting side, while below the seat 2 and behind the backrest 1 are the back side.

The tether system 3 comprises a shoulder strap 31 and a crotch strap 32, the crotch strap 32 has a connecting end 321 and a fixed end 322 respectively arranged on two opposite end portions of its own length extension direction, the crotch strap 32 passes through the seat 2 in a manner of being able to slide in its own length direction, the connecting end 321 is located on the sitting side, and is detachably connected with one end portion of the shoulder strap 31 through a buckle assembly 5, and the fixed end 322 is fixedly connected to the backrest 1.

Specifically, the fixed end 322 is located on the back side, and is fixed on the back of the backrest 1. Here, the back of the backrest 1 is fixedly provided with an anchoring element 11, the fixed end 322 is fixedly connected to the anchoring element 11, to form an anchoring point on the backrest 1. The position of the anchoring point on the backrest 1 is above the rotation centerline of the backrest 1 relative to the seat 2, and the aforementioned anchoring point and the rotation centerline of the backrest 1 relative to the seat 2 are spaced in the height direction of the backrest 1.

In this way, the crotch strap 32 has a first strap segment 32*a* and a second strap segment 32*b* that are connected in the length direction, the first strap segment 32*a* is on the sitting side, the second strap segment 32*b* is located on the back side, the connecting end 321 is located at the outer end of the first strap segment 32*a*, and the fixed end 322 is located at the outer end of the second strap segment 32*b*. It should be noted that the length of crotch strap 32 is constant, which is equal to the sum of the length of the first strap segment 32*a* and the length of the second strap segment 32*b*. The first strap segment 32*a* and the second strap segment 32*b* are not of a fixed length, but can vary in length according to the rotation angle of the backrest 1. When the crotch strap 32 slides relative to the seat 2, the length of the first strap segment 32*a* and the length of the second strap segment 32*b* change inversely. In this embodiment, the shoulder strap 31 slides through the backrest 1. The tether system 3 further comprises an adjustment strap 311, the adjustment strap 311 is fixedly arranged on the shoulder strap 31, the adjustment strap 311 has a connection position in front of the seat 2, a strap adjustment mechanism is arranged at the connection position, the part of the adjustment strap 311 between the aforementioned connection position and the shoulder strap 31 is an adjustment segment 311*a*, and the strap adjustment mechanism is used for adjusting the length of the adjustment segment 311*a*.

The adjustment segment 311*a* is located on the back side of the seat device, the adjustment strap 311 further has an extension segment 311*b* extending to the sitting side, and by operating the extension segment 311*b*, the strap adjustment mechanism can adjust the length of the adjustment segment 311*a*.

Specifically, the shoulder strap 31 comprises a left shoulder strap 312 and a right shoulder strap 313, the left shoulder strap 312 and the right shoulder strap 313 respectively slide through the backrest 1, each of the left shoulder strap 312 and the right shoulder strap 313 has a first end portion 31*a* and a second end portion 31*b* arranged at two opposite ends of its own length direction, and the two first end portions 31*a* are detachably connected to the connecting end 321 of the crotch strap 32 through the buckle assembly 5.

One end portion of the adjustment strap 311 is fixed on the two second end portions 31*b*, and the other end is connected to the front of the seat 2 by bypassing the backrest 1 and the bottom of the seat 2, and then passes through the strap adjustment mechanism and penetrates above the seat 2, and the part of the adjustment strap 311 located above the seat 2 forms the extension segment 311*b*.

The strap adjustment mechanism can adopt a one-way lock mechanism or an automatic winding mechanism, here, a one-way lock mechanism 21 is used, which has a one-way locking element with a ratchet structure, so that the adjustment strap 311 can only be locked and pulled in a single direction, specifically here, when keeping the one-way lock mechanism 21 locked, the user can lengthen the adjustment segment 311*a* by pulling the shoulder strap 31; when it is necessary to shorten the adjustment segment 311*a*, the user can unlock the one-way locking element, and then pull the extension segment 311*b* forward to make the adjustment strap 311 slide and shorten the adjustment segment 311*a*.

The position where the crotch strap 32 is arranged on the seat 2 is behind the connection position between the adjustment strap 311 and the seat 2 in the front-rear length extension direction of the seat 2, specifically, the seat 2 is provided with a through hole that runs through the thickness direction, the crotch strap 32 slides through the through hole along its own length direction, and the one-way lock mechanism 21 is arranged in front of the through hole on the seat 2.

Figures 9, 10, 11, 12, 13, 14:
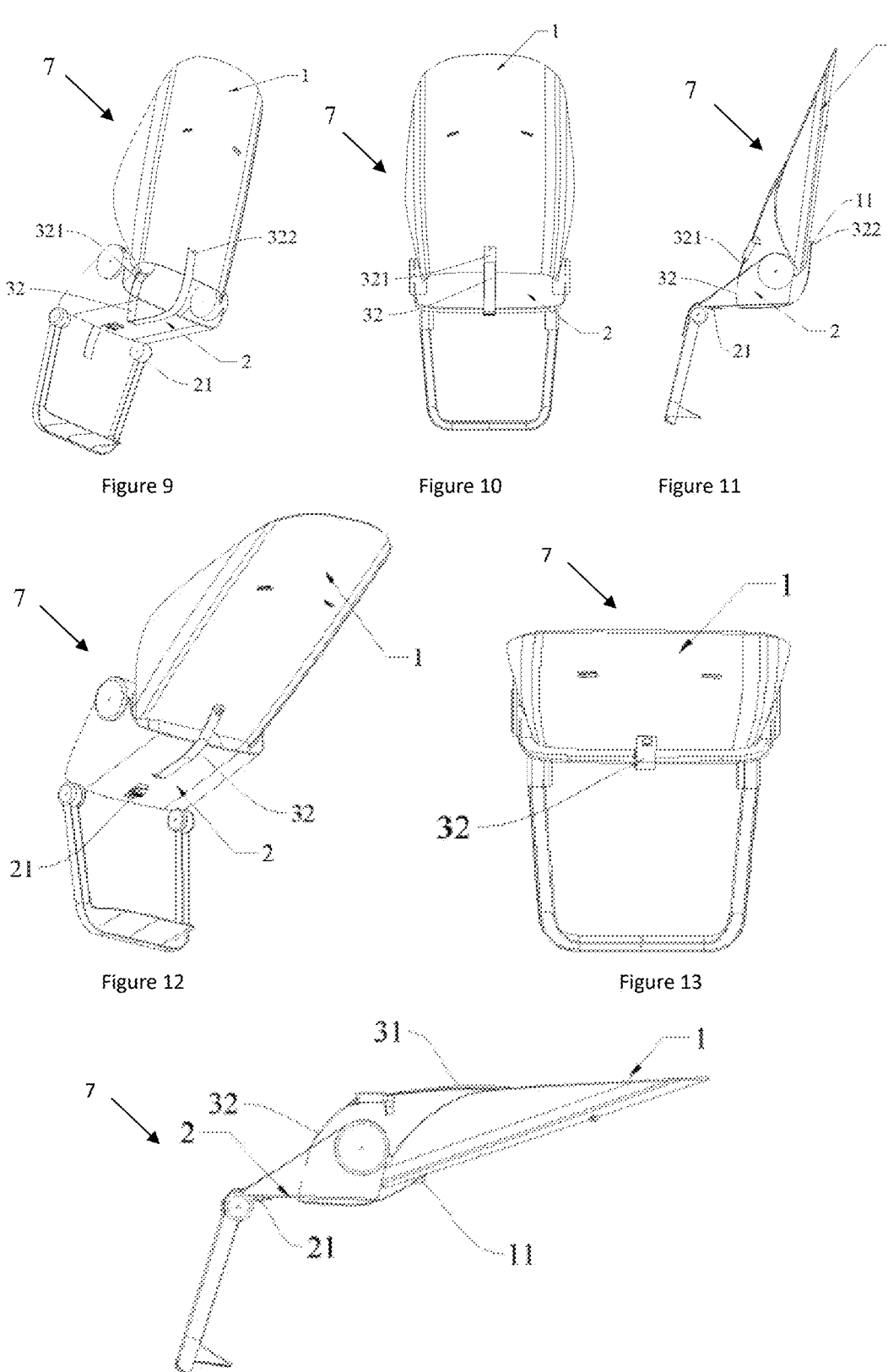
FIG. 9 to FIG. 11 are respectively a stereoscopic schematic diagram, rear-view schematic diagram and side-view schematic diagram of the child sitting saddle in Embodiment 1 of the present disclosure with the shoulder strap and the adjustment strap omitted, where the seat device is in a sitting-posture state.
FIG. 12 to FIG. 14 are respectively a stereoscopic schematic diagram, rear-view schematic diagram and side-view schematic diagram of the child sitting saddle in Embodiment 1 of the present disclosure with the shoulder strap and the adjustment strap omitted, where the seat device is in a lying-posture state.

Thus, when the child seat device is in a sitting-posture state, as shown in FIG. 1 to FIG. 4 and FIG. 9 to FIG. 11, the backrest 1 is in an upright state; when the child seat device is switched to a lying-posture state, as shown in FIG. 5 to FIG. 8 and FIG. 12 to FIG. 14, the backrest 1 is rotated backwards relative to the seat 2, and the angle between the backrest 1 and the seat 2 increases, here, the angle between the backrest 1 and the seat 2 is viewed from the sitting side of the seat device, specifically referring to the angle between the leaning surface of the backrest 1 for a child to lean on and the sitting surface of the seat 2 for a child to sit on. It can be seen that the length of the crotch strap 32 wound between the through hole on the seat 2 and the fixed end 322 is shortened, resulting in a shorter length of the crotch strap 32 on the back side and a longer length of the crotch strap 32 on the sitting side of the seat 2, in other words, the larger the angle between the backrest 1 and the seat 2, the shorter the second strap segment 32*b*, and accordingly the longer the first strap segment 32*a*, which compensates for the total length of the crotch strap 32 and the shoulder strap 31 on the front side of a child body, so as not to be taut on the child's body.

At the same time, through the one-way lock mechanism 21, the user can further release the adjustment strap 311, resulting in a longer length of the adjustment segment 311*a* of the adjustment strap 311, so that both the left shoulder strap 312 and the right shoulder strap 313 can be partially released to the front of the child body, further compensating for the total length of the crotch strap 32 and shoulder strap 31 located on the front of the child body, further avoiding the tether system 3 from binding the child too tightly.

When the child seat device is switched from a lying-posture state to a sitting-posture state, the angle of the backrest 1 relative to the seat 2 decreases, and during the rotation of the backrest 1 towards the seat 2, the fixed end 322 is pulled up, causing the crotch strap 32 to be pulled towards the back side, reducing the length of the crotch strap 32 and the shoulder strap 31 located on the front of the child body, making the child firmly bound to the child seat device.

Of course, when the backrest 1 needs to be adjusted between different sitting-posture states, the angle change of the backrest 1 will cause the crotch strap 32 to slide along its own length direction and correspondingly adjust the length on the sitting side or back side of the seat 2, compensating for the total length of the crotch strap 32 and the shoulder strap 31 located on the front side of the child body, avoiding the tether system 3 from binding the child too tightly.

In this embodiment, the tether system 3 adopts a five-point safety strap, which further comprises two waist straps 4 connected to the left and right sides of the lower portion of the backrest 1, the end portions of the waist straps 4 are detachably connected to the crotch strap 32 and shoulder strap 31 through the buckle assembly 5 to achieve stable binding of the child.

Embodiment 2

Figures 15, 16:
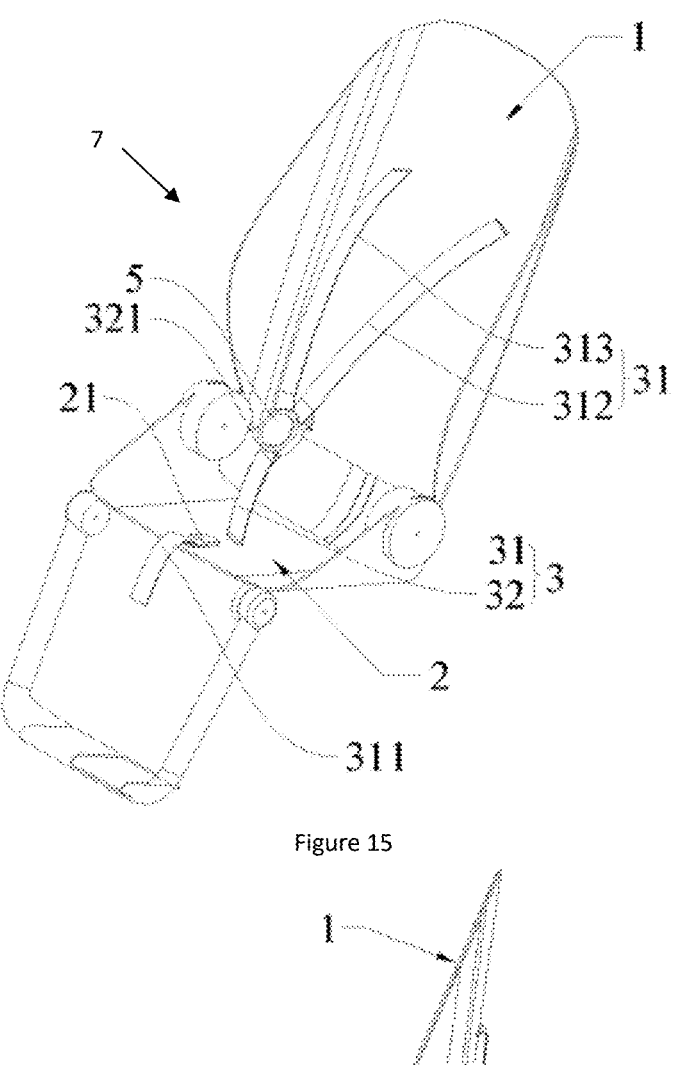
FIG. 15 to FIG. 17 are respectively a stereoscopic schematic diagram, side-view schematic diagram and front-view schematic diagram of the child sitting saddle in Embodiment 2 of the present disclosure, where the seat device is in a sitting-posture state.
Figure 17:
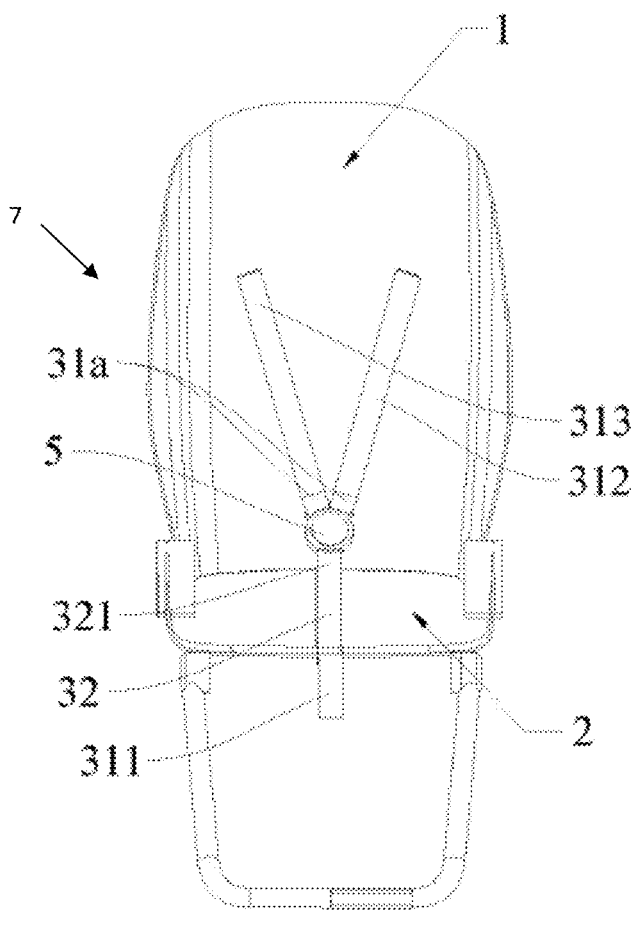
Figure 18:
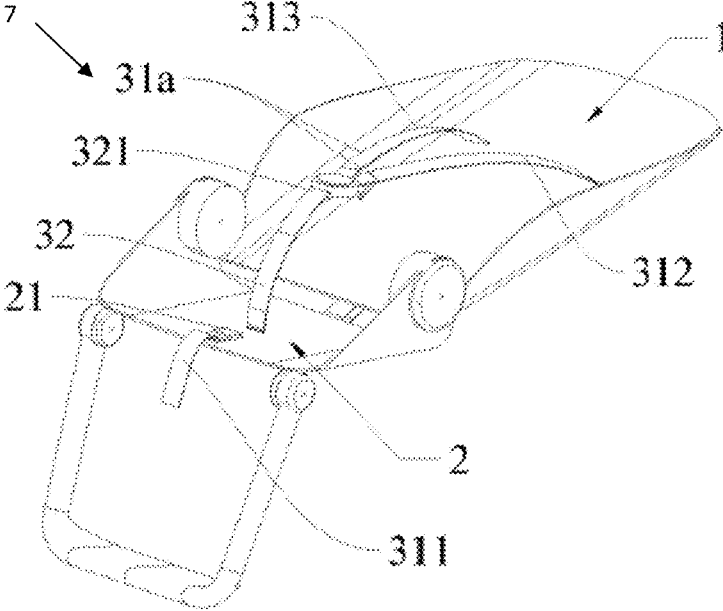
FIG. 18 to FIG. 20 are respectively a stereoscopic schematic diagram, side-view schematic diagram and front-view schematic diagram of the child sitting saddle in Embodiment 2 of the present disclosure, where the seat device is in a lying-posture state.
Figure 19:
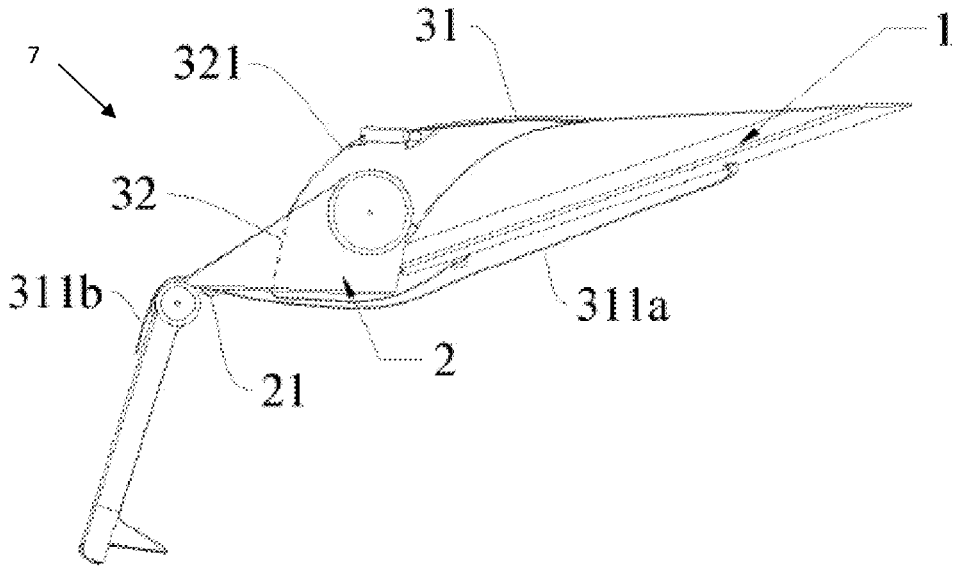
Figure 20:
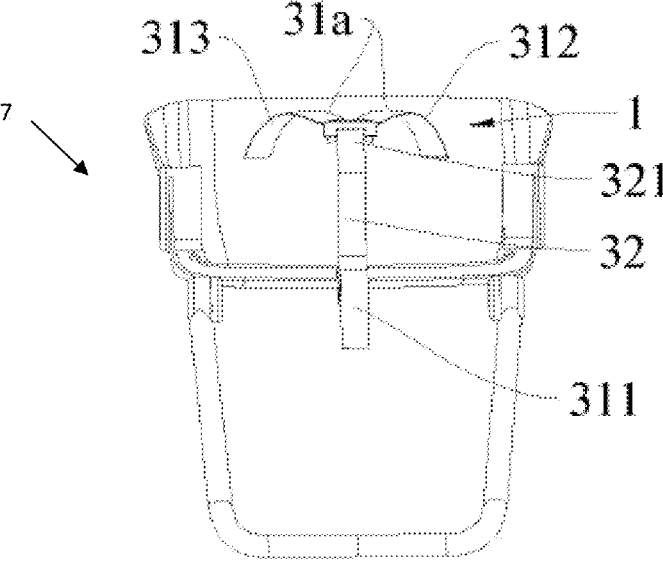

As shown in FIG. 15 to FIG. 20, this embodiment mainly differs from Embodiment 1 by the arrangement of the tether system 3, and in this embodiment, the tether system 3 does not comprise the two waist straps 4 in Embodiment 1, and the other arrangements are basically the same, which will not be repeated here.

Embodiment 3

Figures 21, 22, 23, 24:
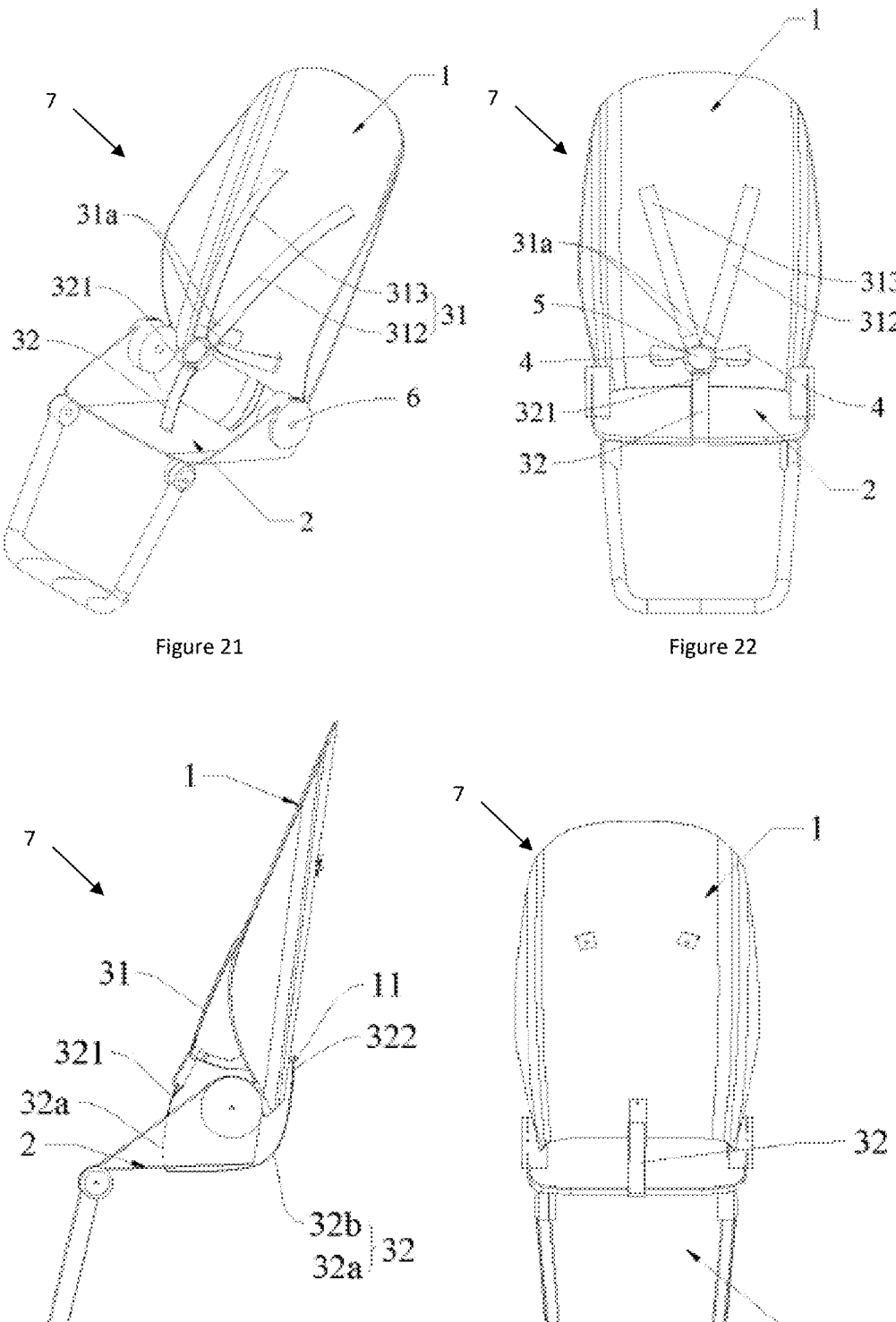
FIG. 21 to FIG. 24 are respectively a stereoscopic schematic diagram, front-view schematic diagram, side-view schematic diagram and rear-view schematic diagram of the child sitting saddle in Embodiment 3 of the present disclosure, where the seat device is in a sitting-posture state.
Figures 25, 26, 27, 28:
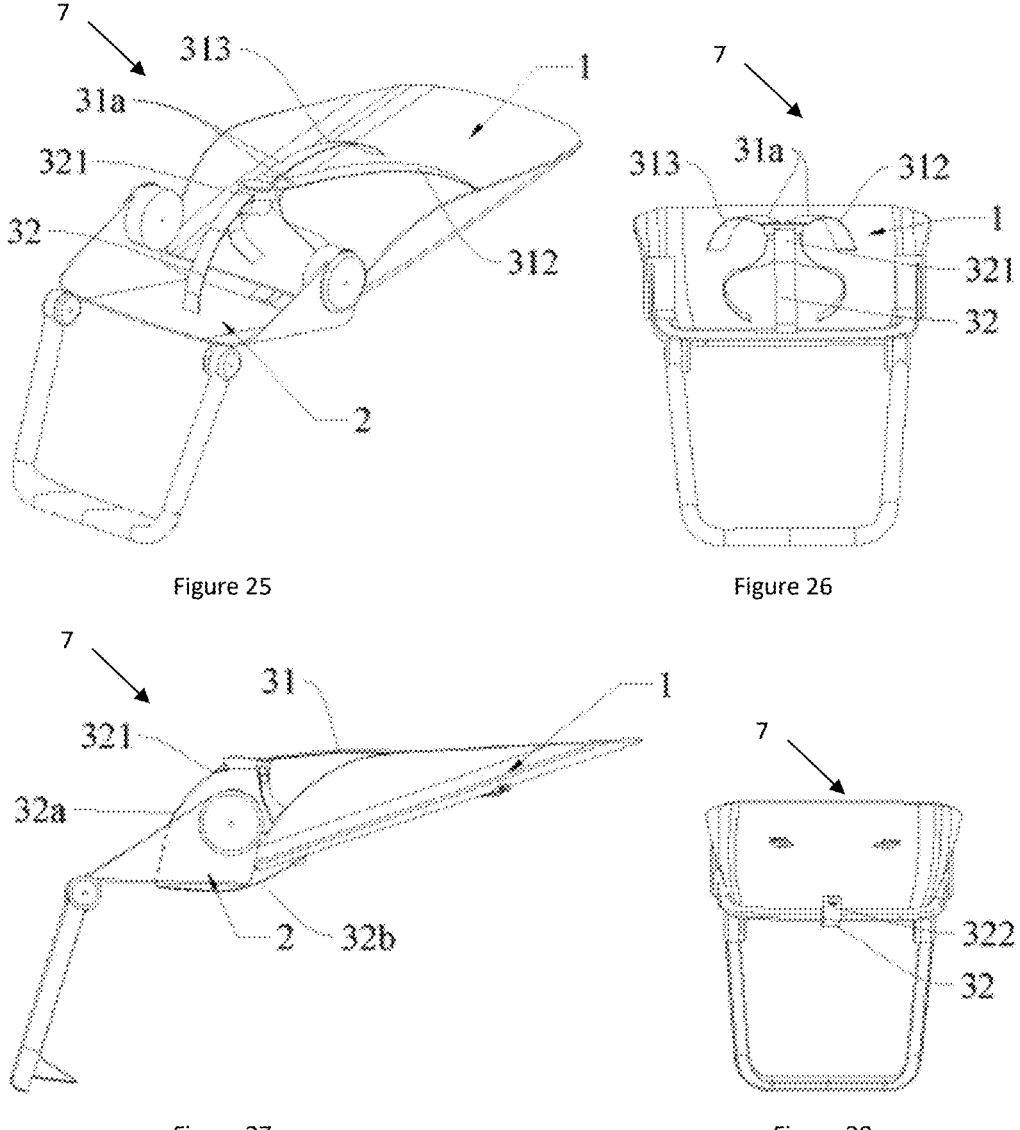
FIG. 25 to FIG. 28 are respectively a stereoscopic schematic diagram, front-view schematic diagram, side-view schematic diagram and rear-view schematic diagram of the child sitting saddle in Embodiment 3 of the present disclosure, where the seat device is in a lying-posture state.

As shown in FIG. 21 to FIG. 28, this embodiment mainly differs from Embodiment 1 by that the arrangement of the adjustment strap 311 is missing in this embodiment. In this embodiment, the upper end portions of the left shoulder strap 312 and the right shoulder strap 313 are fixed on the backrest 1, and the lower end portions are detachably connected to the crotch strap 32 through the buckle assembly 5. Correspondingly, when the backrest 1 rotates relative to the seat 2 to achieve angle adjustment, compensation is only achieved by relying on the sliding of the crotch strap 32 along its own length direction to avoid the tether system from binding the child too tightly.

Embodiment 4

Figures 29, 30, 31, 32, 33, 34:
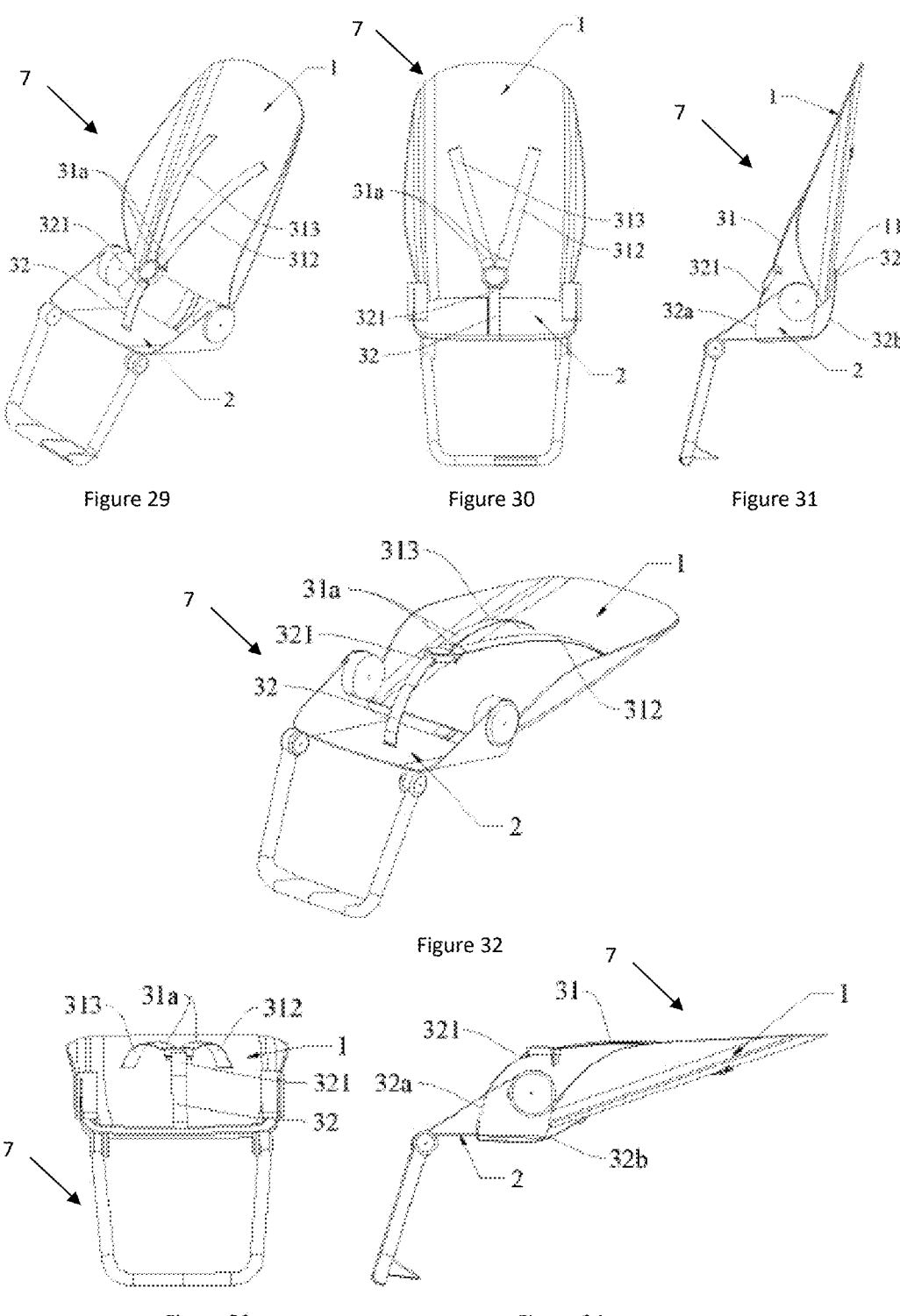
FIG. 29 to FIG. 31 are respectively a stereoscopic schematic diagram, front-view schematic diagram and side-view schematic diagram of the child sitting saddle in Embodiment 4 of the present disclosure, where the seat device is in a sitting-posture state.
FIG. 32 to FIG. 34 are respectively a stereoscopic schematic diagram, front-view schematic diagram and side-view schematic diagram of the child sitting saddle in Embodiment 4 of the present disclosure, where the seat device is in a lying-posture state.

As shown in FIG. 29 to FIG. 34, this embodiment mainly differs from Embodiment 3 by the arrangement of the tether system 3, and in this embodiment, the tether system 3 does not comprise the two waist straps 4 in Embodiment 3, and the other arrangements are basically the same, which will not be repeated here.

Of course, the adjustment of the above functions can also be achieved on child products such as a child stroller having the above-mentioned child seat device. When a child sits in this seat device, and when adjusting the angle between the backrest 1 and the seat 2 to meet the needs of the child in different sitting or lying postures, the tether system 3 can be adjusted with the rotation of the backrest 1 and automatically compensate for the total length of a safety belt on the front side of the child body when the angle between the backrest 1 and the seat 2 is increased, such that the child is not bound too tightly; when the angle of the backrest 1 is decreased, the total length of the safety belt on the front side of the child body is automatically reduced so as to ensure that the tether system 3 binds the child firmly.

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

What is claimed is:

1. A child seat device comprising a backrest, a seat and a tether system, the backrest being rotatably connected to the seat, the seat device having a sitting side and a back side, wherein, the tether system comprises a shoulder strap and a crotch strap, the shoulder strap is arranged on the backrest, the crotch strap has a connecting end and a fixed end, the connecting end and the fixed end are respectively arranged on two opposite end portions of a length extension direction of the crotch strap, a portion of the crotch strap on the sitting side is a first strap segment, the connecting end is located on the first strap segment and can be detachably connected to one end of the shoulder strap, the fixed end is fixedly connected to the back side of the seat device, the seat device has a sitting-posture state and a lying-posture state, a length of the first strap segment in the sitting-posture state is shorter than the length of the first strap segment in the lying-posture state.

2. The child seat device of claim 1, wherein, the crotch strap passes through the seat in a manner of being able to slide in its own length direction.

3. The child seat device of claim 2, wherein, the crotch strap further has a second strap segment on the back side, the fixed end is located on the second strap segment, the second strap segment and the first strap segment are connected in the length direction.

4. The child seat device of claim 1, wherein, the fixed end is fixedly connected to the backrest.

5. The child seat device of claim 4, wherein, the backrest has an anchoring element, the fixed end is fixedly connected to the anchoring element, and the anchoring element and a rotation centerline of the backrest relative to the seat are spaced in the height direction of the backrest.

6. The child seat device of claim 5, wherein, the anchoring element is located on the backrest above the rotation centerline of the backrest relative to the seat.

7. The child seat device of claim 1, wherein, a lower portion of the backrest is connected to a rear portion of the seat through a soft component, or, a lower portion of the backrest is rotatably connected to a rear portion of the seat through a rotation shaft, and a rotation centerline between the seat and the backrest extends in a left-right direction.

8. The child seat device of claim 1, wherein, the shoulder strap slides through the backrest, the tether system further comprises an adjustment strap, the adjustment strap is fixedly arranged on the shoulder strap; the adjustment strap has a connection position in front of the seat, and an adjustment segment between the connection position and the shoulder strap; and the seat is provided with a strap adjustment mechanism for adjusting the length of the adjustment segment.

9. The child seat device of claim 8, wherein, the strap adjustment mechanism is a one-way lock mechanism or an automatic winding mechanism.

10. The child seat device of claim 8, wherein, the adjustment segment is located on the back side, the adjustment strap is slidably connected to a front portion of the seat, and the adjustment strap has an extension segment extending to the sitting side.

11. The child seat device of claim 8, wherein, the position where the crotch strap is arranged on the seat is behind the connection position between the adjustment strap and the seat in the length extension direction of the seat.

12. The child seat device of claim 8, wherein, the shoulder strap comprises a left shoulder strap and a right shoulder strap, the left shoulder strap and the right shoulder strap respectively slide through the backrest, each of the left shoulder strap and the right shoulder strap has a first end portion and a second end portion arranged at two opposite ends of its own length direction, the first end portions can be detachably connected to the connecting end of the crotch strap, and the two second end portions are fixedly arranged on the adjustment strap.

13. The child seat device of claim 1, wherein, one end portion of the shoulder strap is fixedly arranged on the backrest, and the other end portion of the shoulder strap is detachably connected to the connecting end of the crotch strap.

14. A child product, wherein, it comprises the child seat device of claim 1.

15. The child product of claim 14, wherein, the child seat device is a child sitting saddle.

* * * * *